United States Patent Office 3,298,059
Patented Jan. 17, 1967

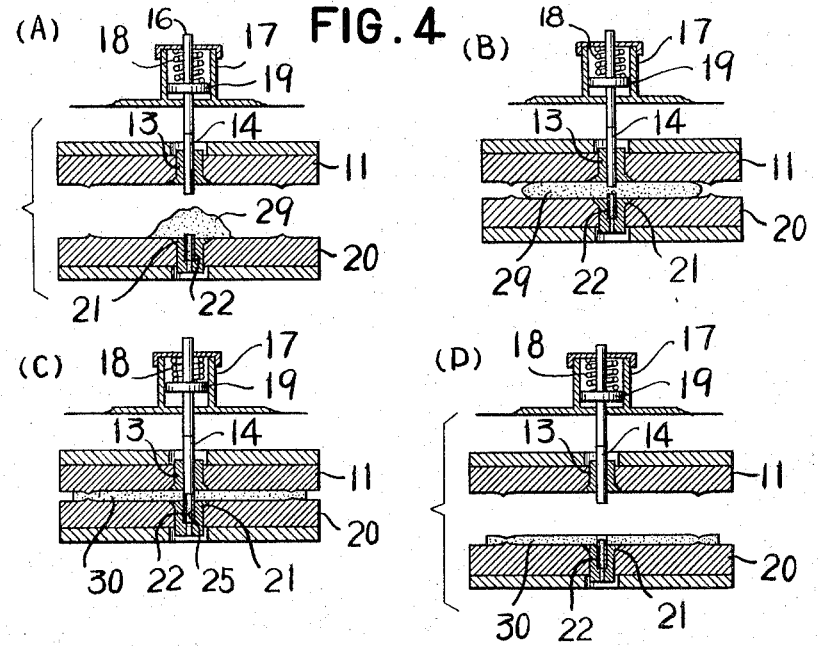
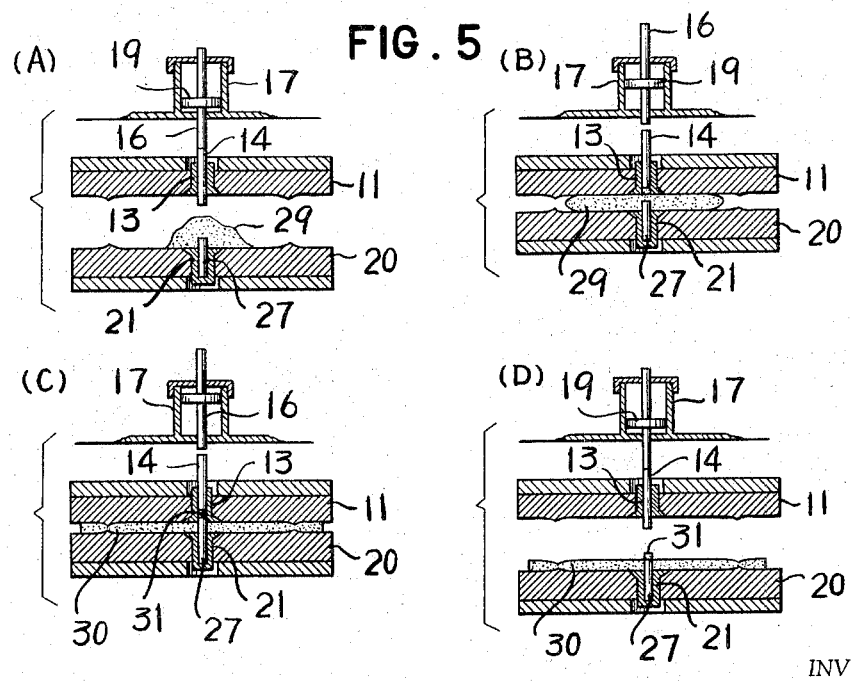

3,298,059
PRESS MACHINE FOR MOLDING RECORDS
Hiromitsu Sakamoto, Katsushika-ku, Tokyo, Japan, assignor to Victor Company of Japan, Limited, Yokohama, Japan
Filed June 4, 1965, Ser. No. 461,446
Claims priority, application Japan, June 11, 1964, 39/32,898
5 Claims. (Cl. 18—5.3)

The present invention relates to a press machine for molding phonograph records, and especially relates to a press machine capable of molding records with no generation of the fins or over flow in the central part of the record.

In molding of the records by the former press machine, the fins are generated in the central hole and on the outer periphery of the molded record. The fins on the outer periphery of the record, after molding is finished, can be cut away easily by a motor driven cutter, but the fins of the central hole must be removed manually by a knife etc. This cutting operation of the fins of the central hole must be done in a short time during the next press step prior to cutting of the fins protruded on the outer periphery of the record, and is needed to be done quickly and with some degree of skillfulness to avoid deterioration of the record. And yet, in this operation, as the knife is used, finishment of the central hole of the record does not become smooth, and lowers the merchandise value. And since the cutting operation needs two to four seconds, especially when two press machines are operated by one person, it becomes a serious problem.

Further, as described later, in the conventional press machine, in order to mold the center hole of the record, a center pin is provided and used at each pressing operation of the record, so that wear of the center pin is great, especially when the centers of said center pin and the center hole are displaced somewhat. This may result in damage to the pin.

According to the present invention, the above-mentioned defects of the conventional press machines are obviated.

The main object of the present invention is to present a novel and useful press machine for molding a record with no generation of the fins in the central hole of the record.

Another object of the present invention is to present a novel and useful press machine for molding a record with no wearing of the center pin of the press machine.

A further object of the present invention is to provide a novel and useful press machine for molding a record which facilitates the record molding operation and is capable of shortening the working hours thereof.

Further objects and characteristics will be apparent from the following description with reference to the drawings.

Figure 6:
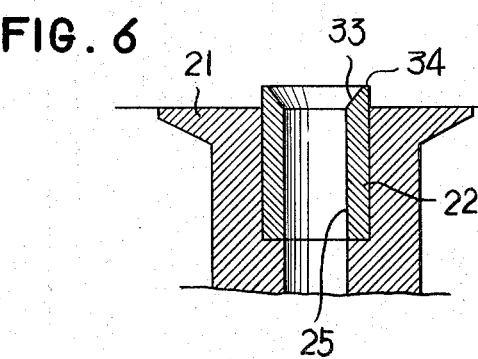
Figure 2:
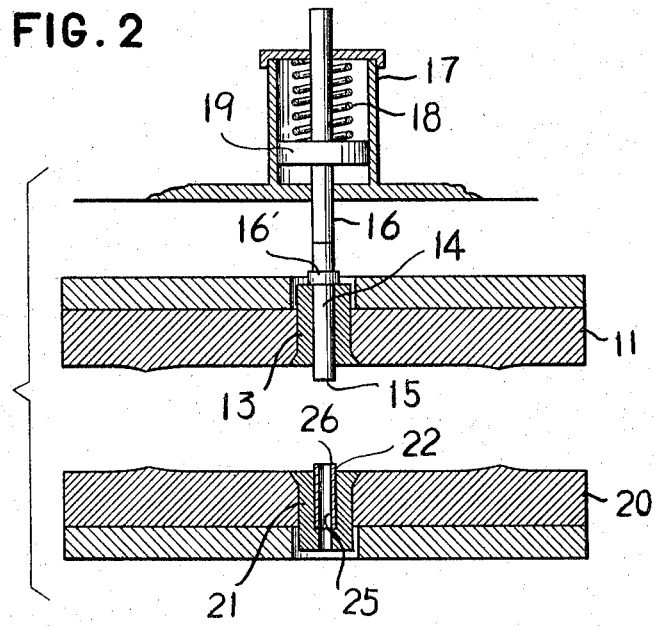
FIG. 2 is a longitudinal sectional side view of the essential part of the press machine shown in FIG. 1.
Figure 3:
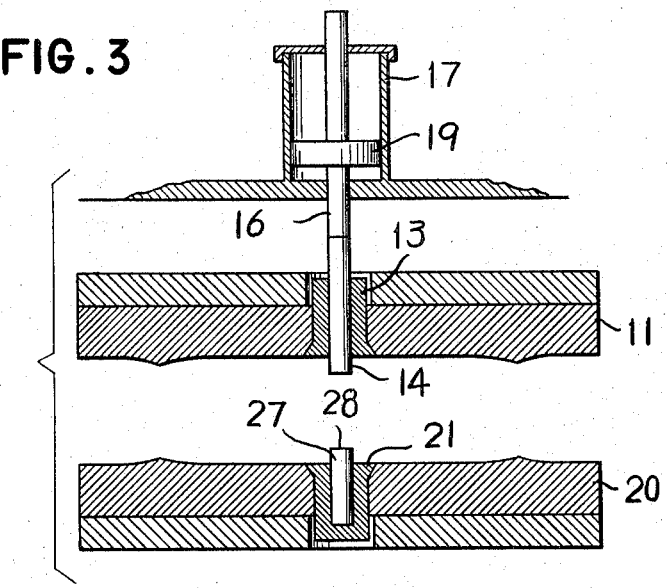
FIG. 3 is a longitudinal sectional side view of the part of the conventional press machine corresponding to the part shown in FIG. 2.

FIGS. 4(A)–(D) are the drawings showing the manner of operations of the parts shown in FIG. 2;

FIGS. 5(A)–(D) are the drawings showing the manner of operations of the parts shown in FIG. 3;

FIG. 6 is a longitudinal sectional side view of one example of a center pin used in the press machine according to the present invention.

Figure 1:
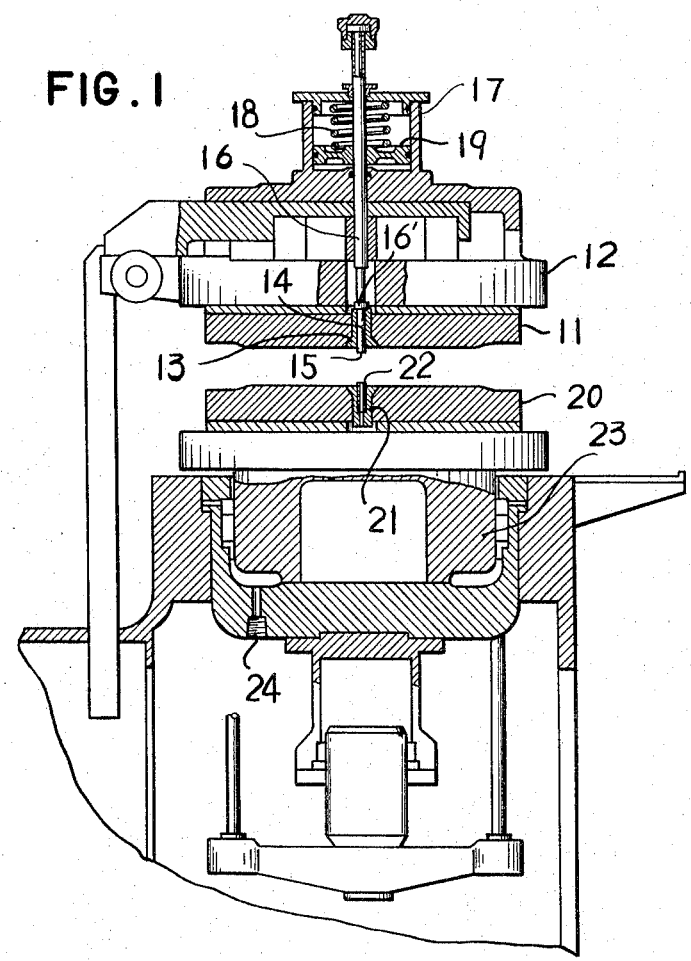
FIG. 1 is a longitudinal sectional side view of one example of the press machine for molding the record according to this invention.

Referring to the drawings, FIG. 1 shows a longitudinal sectional side view of one example of the press machine for molding records according to this invention. 11 is an upper mold composed of an upper case for heating and cooling and having an upper face stamp (not shown), 12 an upper platen and, 13 a center member inserted and fixed in the central part of said upper mold 11. In the center of upper mold 11, a center pin 14, which serves to mold the center hole of the record, is slidably inserted for up and down movement. 15 is an end portion of said center pin 14 which protrudes about 5 mm. from the surfaces of said upper mold 11 and center member 13, and which is movable upward by 4.4 mm. at the greatest compression, as will be described later. 16 refers to a knock bar having a stopper 16' slidable up and down with the center pin 14. 17 is a cylinder in which is provided a spring 18, and 19 is a piston fixed to the knock bar 16 and arranged to slide up and down in said cylinder with the up and down motion of said knock bar. 20 is a lower mold composed of a lower case for heating and cooling and a lower face stamp (not shown). A center member 21 is inserted and fixed into the central part of said lower mold 20, and in the center of member 21, a center pin 22 for molding the center hole of the record is inserted and fixed. A ram cylinder 23 is provided for pressing up and down movement in response to pressure oil entering from a pressure oil feed hole 24.

FIG. 2 is a longitudinal side sectional view of the essential parts of the press machine of FIG. 1 with parts similar to those shown in FIG. 1 being shown by the same number and an explanation therefor being omitted. In FIG. 2, a hollow cylindrical center pin 22 is inserted and fixed in the center of the center member 21 and has a record raw material flowing hole 25 passing through the center part thereof. An end portion 26 of said pin 22 protrudes about 2 mm. from the surfaces of the lower mold 20 and the center member 21. Further, the center pins 14 and 22 have the same outer diameter, which is about 7.3 mm. Each pin 14 and 22 is arranged in such a way that, when said lower mold 20 moves upward by the action of oil pressure, end portions 15, 26 of each pin are brought into intimate contact completely and the axial direction of each pin becomes the same. The center pin 14 is inserted to move up and down in the center member 13 which is fixed in the upper mold 11, and said pin is pressed down by the spring 18 until the stopper 16' comes in contact with the upper end of the center member 13. Operation of the press machine having such construction will be explained later.

FIG. 3 is a longitudinal sectional side view, similar to FIG. 2, but depicting parts of a conventional press machine. The parts similar to those shown in FIG. 2 are shown by the same number, and explanation thereof is omitted. In this conventional press machine, the knock bar moves up and down by the up and down motion of the piston 19. Cylindrical center pin 27 is inserted and fixed in the center of the central member 21 which is engaged and fixed in the lower mold 20. The end portion 28 of said center pin 27 moves through part of the raw material into the center member 13 of the upper mold 11, when the lower mold 20 is moved upward by the action of the pressure oil. Working steps using the conventional press machine are shown in FIGS. 5(A)–(D) as follows:

Firstly, a label (not shown) is inserted between the upper and lower pins 14, 27, and a raw material 29 for the record is put on the lower mold 20 as shown in FIG. 5(A). When the lower mold 20 is moved upward by the oil pressure device as shown in FIG. 5(B), the piston 19 in the cylinder 17 is moved upward in which the pin 14 can move upward. The lower mold 20 moves upward further, and presses the raw material 29 at pre-determined pressure as shown in FIG. 5(C). In this state, the raw material 29 extends completely between the upper mold 11 and lower mold 20. On both the upper and lower surfaces are impressed the sound grooves, thus the record 30 is completed. The pin 27 fixed to the lower mold 20 is inserted into the center member 13 of the upper mold 11, and the central hole of the record is molded. At the same time the part 31 of the raw material situated on the pin 27 enters into the center member 13, and pushes up the pin 14. After upper and lower molds 11, 20 are cooled, the lower mold 20 descends, at which time the piston 19 in the cylinder 17 moves downward and pushes down the pin 14. Thus the molded record 30 can be taken out.

But in this system, the part 31 of the raw material remains upon the pin 27 so that when the molded record 30 is taken off from the lower mold 20, this part adheres to the central hole of the completed record 30. Accordingly, before the next work, it is necessary to cut away the part 31 of the raw material adhered to the central hole, therefore resulting in much inconvenience.

The present invention obviates these defects in the conventional device. Working steps using the press machine having the construction according to this invention as shown in FIG. 2 are shown in FIGS. 4(A) to (D).

At first, a label (not shown) is inserted in upper and lower pins 14, 22, and a raw material 29 for the record is put on the lower mold 20 as shown in FIG. 4(A). Next, when the lower mold 20 is moved upward as shown in FIG. 4(B), the part of the raw material 29 interposed between upper and lower center pins 14, 22 is pressed by these both pins 14, 22, and the greater part of the raw material is extended about said both pins. Further, when the lower mold 20 is moved upward and the raw material is compressed, the movement upward of the center pin 14 is counter-acted by the force of the spring 18, so that the part of the raw material 29 interposed between both center pins 14, 22 is pressed into the raw material flowing hole 25 of pin 22.

FIG. 4(C) shows the state in which the lower mold 20 moves upward further and compression is ended at the highest pressure of 300 kg. In this state, the raw material of record 29 spreads completely between the upper mold 11 and the lower mold 20, and the said grooves are impressed both on the upper and lower faces to finish record 30. At this time, end portions 15, 26 of both center pins 14, 22 are in intimate contact with each other as they protrude from the faces of the upper mold 11 and lower mold 20. During transition from the state as shown in FIG. 4(B) to the state as shown in FIG. 4(C) the raw material 29 interposed between said both center pins is pressed into the raw material flowing hole 25 by the pressure of 50–60 kg., and presses out the raw material filled in said flowing hole in the previous working step. Since the raw material put between both center pins 14, 22 during compression molding is pressed into the raw material flowing hole, there is no generation of any fins due to the raw material 31 as in molding by the conventional press machine.

Further, in the most pressed state as shown in FIG. 4(C), the amount of protrusion of the pin 22 is 2 mm., the thickness of the record is 2.6 mm., and pin 14 is protruded about 0.6 mm. due to the press down force by the spring 18. Therefore pin 22 does not enter in the upper center member 14. Next, after said compression is ended, both upper and lower molds are cooled and, thereafter, the lower mold 20 is lowered and the pressed and molded record 20 is ready for taking off as shown in FIG. 4(D).

According to the press machine of the present invention as described above, there is no generation of the fins such as appeared heretofore in the central hole of the pressed and molded record. Furthermore since the upper center pin does not enter in the lower center member, there is no wear of these parts.

FIG. 6 shows an enlarged longitudinal sectional side view of one example of the extruded end portion of the lower center pin 22. As shown in FIG. 6, if a funnel shaped tapered part 33 is provided at the end part of the raw material flow hole 25, flow of the raw material of record into the flow hole 25 on the compression of the raw material of record is ameliorated. Also, the area of the upper end part 34 of the lower center pin 22 which contacts the upper center pin 14 at the greatest compression is small so that, after compression and molding, there is no generation of thin film fins on the upper end of said pin.

Further, the present invention is not limited to the embodiment described above. For example, the raw material flow hole may be provided in the upper center pin, or in both center pins. Also, various other modifications may be made without departing from the spirit of this invention.

What I claim is:

1. A press machine for molding records comprising an upper mold for pressing sound grooves in a raw material, an upper center pin carried by said upper mold, a lower mold corresponding to said upper mold, means to move said molds together to compress and mold a raw material placed therebetween, a lower center pin carried by said lower mold in alignment with said upper center pin so that the free ends of said pins contact at the time of the maximum compression of said raw material, and a raw material receiving hole provided through the center of at least one of said pins for receiving and discharging a part of the raw material of the record at the time of said compression.

2. A press machine for molding records described in claim 1, wherein said pins project from their respective molds at the time of the maximum compression of the raw material.

3. A press machine for molding records described in claim 2, wherein the raw material receiving hole is provided in said lower center pin, wherein said upper center pin is axially slidably mounted in said upper mold, and further comprising means to urge said upper center pin to a projecting position during the compression of the raw material.

4. A press machine for molding records described in claim 1, wherein the end portion of said raw material flowing hole is tapered.

5. A press machine for molding records described in claim 1, wherein each of said pins is provided with a raw material receiving hole.

References Cited by the Examiner

UNITED STATES PATENTS

| | | | |
|---|---|---|---|
| 879,363 | 2/1908 | Cheney | 18—5.3 |
| 1,576,642 | 3/1926 | Bishop | 18—5.3 |
| 2,615,111 | 10/1952 | Paquette et al. | |

WILLIAM J. STEPHENSON, *Primary Examiner.*